(12) United States Patent
Mentovich et al.

(10) Patent No.: US 10,177,841 B2
(45) Date of Patent: Jan. 8, 2019

(54) ELECTRO-OPTIC TRANSCEIVER MODULE WITH WAVELENGTH COMPENSATION

(71) Applicant: Mellanox Technologies, Ltd., Yokneam (IL)

(72) Inventors: Elad Mentovich, Tel Aviv (IL); Itshak Kalifa, Ramat Gan (IL); Sylvie Rockman, Zichron Yaakov (IL); Alon Webman, Tel Aviv (IL); Dalit Kimhi, Ramat Hasharon (IL); Alex Dikopoltsev, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/087,562

(22) Filed: Mar. 31, 2016

(65) Prior Publication Data
US 2017/0288770 A1   Oct. 5, 2017

(51) Int. Cl.
*H04B 10/08* (2006.01)
*H04B 17/00* (2015.01)
*H04J 14/02* (2006.01)
*H04B 10/04* (2006.01)
*H04B 10/079* (2013.01)
(Continued)

(52) U.S. Cl.
CPC ..... *H04B 10/0795* (2013.01); *H04B 10/2504* (2013.01); *H04B 10/503* (2013.01); *H04B 10/572* (2013.01); *H04J 14/02* (2013.01)

(58) Field of Classification Search
USPC ........... 398/135, 25, 79, 192, 33; 372/34, 32
See application file for complete search history.

(56) References Cited

U.S. PATENT DOCUMENTS 5,978,395 A * 11/1999 Nomura ............... H01S 5/06808
                                                                         372/29.015
6,775,308 B2 *  8/2004 Hamster ............... G02B 6/4204
                                                                         257/E25.032
(Continued)

OTHER PUBLICATIONS

Olemodo, Miguel Iglesias et al. "Gigabit Access Passive Optical Network using Wavelength Division Multiplexing—Giga WaM." Journal of Lightwave Technology, vol. X, No. X., Aug. 2014, 9 pages.

*Primary Examiner* — David Payne
*Assistant Examiner* — Pranesh Barua
(74) *Attorney, Agent, or Firm* — Alston & Bird LLP (57) ABSTRACT

An electro-optic transceiver module, method of manufacturing, and method of transmitting signals are provided that allow multiple optical signals at different wavelengths (e.g., according to CWDM) to be combined for transmission via a number of optical fibers that is smaller than the number of electrical channels according to which the optical signals were generated. Thus, CWDM may be used in connection with lower-cost VCSEL technology (e.g., as opposed to higher-cost edge-emitting lasers) by providing for wavelength compensation at the VCSEL driver to offset any changes in wavelength that may have otherwise occurred at the VCSELs. In particular, a microcontroller of the electro-optic transceiver module correlates a monitored temperature of the VCSELs to an actual wavelength of the corresponding optical signals transmitted by the respective VCSELS and determined an adjustment in a current supplied by the VCSEL driver to each VCSEL to achieve more precise and consistent wavelengths at the VCSELs.

20 Claims, 8 Drawing Sheets

(51) Int. Cl.
*H04B 10/572* (2013.01)
*H04B 10/50* (2013.01)
*H04B 10/25* (2013.01)

(56) References Cited

U.S. PATENT DOCUMENTS

| | | | | |
|---|---|---|---|---|
| 7,412,170 | B1* | 8/2008 | Louderback | H01S 5/423 398/158 |
| 7,460,572 | B2* | 12/2008 | Kawai | H01S 5/068 372/20 |
| 8,208,507 | B2* | 6/2012 | Lerner | G02B 6/4201 372/29.01 |
| 8,699,533 | B1* | 4/2014 | Wach | H01S 5/02212 372/34 |
| 9,258,063 | B1* | 2/2016 | Oomori | H04B 10/503 |
| 2003/0081289 | A1* | 5/2003 | Oomori | H01S 5/02415 398/135 |
| 2003/0095736 | A1* | 5/2003 | Kish, Jr. | B82Y 20/00 385/14 |
| 2004/0008986 | A1* | 1/2004 | Yoneda | H04B 10/503 398/33 |
| 2004/0114646 | A1* | 6/2004 | Stewart | H01S 5/0612 372/34 |
| 2005/0018184 | A1* | 1/2005 | Imura | G01J 3/10 356/300 |
| 2005/0249252 | A1* | 11/2005 | Sanchez | H04B 10/564 372/38.07 |
| 2005/0286909 | A1* | 12/2005 | Kish, Jr. | B82Y 20/00 398/196 |
| 2006/0098699 | A1* | 5/2006 | Sanchez | H01S 5/068 372/26 |
| 2006/0145051 | A1* | 7/2006 | Kawai | H01S 5/068 250/201.1 |
| 2006/0153256 | A1* | 7/2006 | Sanchez | H01S 5/042 372/34 |
| 2006/0153570 | A1* | 7/2006 | Nelson | H04B 10/504 398/135 |
| 2006/0165140 | A1* | 7/2006 | Tan | G06F 3/0317 372/33 |
| 2007/0248128 | A1* | 10/2007 | Krestnikov | H01S 5/02276 372/38.02 |
| 2008/0031294 | A1* | 2/2008 | Krishnamoorthy | H01S 5/02453 372/34 |
| 2008/0292322 | A1* | 11/2008 | Daghighian | H04B 10/40 398/192 |
| 2009/0020684 | A1* | 1/2009 | Shih | G01J 1/32 250/205 |
| 2009/0080903 | A1* | 3/2009 | Moriyasu | H04B 10/572 398/182 |
| 2009/0251684 | A1* | 10/2009 | Arai | H01S 5/06804 356/43 |
| 2010/0183307 | A1* | 7/2010 | Matsumoto | H04J 14/0221 398/79 |
| 2011/0164633 | A1* | 7/2011 | Moench | H01S 5/0262 372/32 |
| 2011/0170856 | A1* | 7/2011 | Kannari | H04B 10/032 398/2 |
| 2012/0045202 | A1* | 2/2012 | Jiang | H04B 10/40 398/38 |
| 2014/0147127 | A1* | 5/2014 | McColloch | H05K 7/20409 398/135 |
| 2014/0270778 | A1* | 9/2014 | Hui | H04B 10/2503 398/79 |
| 2014/0368832 | A1* | 12/2014 | Salvade | G01B 5/008 356/497 |
| 2015/0043600 | A1* | 2/2015 | Ying | H01S 5/06804 372/38.02 |
| 2015/0155686 | A1* | 6/2015 | Berkram | H01S 5/042 372/29.021 |
| 2015/0381277 | A1* | 12/2015 | Shimizu | H04B 10/572 398/34 |

* cited by examiner

ELECTRO-OPTIC TRANSCEIVER MODULE WITH WAVELENGTH COMPENSATION

BACKGROUND

The present disclosure relates in general to electro-optic interfaces for transmitting optical signals through fiber optic cable systems. In particular, systems and methods are described that allow multiple optical signals at different wavelengths that are generated by VCSELs to be multiplexed into a single combined optical signal and transmitted over a single fiber.

The use of fiber optic cable for data transmission has provided several advantages over the use of copper cable. For example, optical fiber offers very high bandwidth, as well as the ability to accommodate increases in bandwidth (e.g., when data traffic spikes). Optical fiber also provides good resistance to electromagnetic interference and is considered to be a very secure transmission medium.

The demand for communication cables that support higher bandwidth per cross-section, however, continues to rise. Moreover, fiber optic datacenters still face challenges when it comes to the rising costs involved with the installation and ongoing support of their cables and equipment.

BRIEF SUMMARY

Embodiments of the invention described herein therefore provide improved electro-optic transceiver modules that allow the use of lower-cost vertical-cavity surface-emitting lasers (VCSELs) to convert electrical signals into optical signals at wavelengths that are selected using a coarse wavelength division multiplexing (CWDM) scheme. Although VCSELs are generally susceptible to variations in temperature, which can affect the wavelength of the optical signals produced, embodiments of the invention monitor the operating conditions of the VCSELs and cause the VCSEL drivers to preemptively compensate for any variations in wavelength, thereby allowing the VCSEL to produce optical signals according to a CWDM scheme that have the required wavelengths for optimal performance when multiplexed and transmitted as a combined optical signal through a single optical fiber.

Accordingly, in some embodiments, an electro-optic transceiver module is provided that includes a plurality of vertical-cavity surface-emitting lasers (VCSELs), where each VCSEL is configured to convert an electrical signal to a corresponding optical signal for transmission through a fiber optic cable. The electro-optic transceiver module further includes at least one VCSEL driver and an optical multiplexer coupled to the plurality of VCSELs. The at least one VCSEL driver comprises driving circuitry and is configured to control operation of a corresponding VCSEL of the plurality of VCSELs such that each optical signal has a wavelength that is different from a wavelength of every other optical signal of the plurality of VCSELs. The optical multiplexer is configured to receive a plurality of optical signals from the plurality of VCSELs, combine the plurality of optical signals into a single combined optical signal comprising multiple wavelengths, and transmit the single combined optical signal through a single optical fiber. The electro-optic transceiver module further includes a microcontroller configured to monitor a temperature of each VCSEL, correlate the monitored temperature of each VCSEL to an actual wavelength of the corresponding optical signal transmitted by each respective VCSEL, determine an adjustment in a current supplied by the at least one VCSEL driver to each respective VCSEL for which the actual wavelength of the optical signal transmitted is outside a tolerated band of desired wavelengths, and communicate the adjustment to the at least one VCSEL driver.

In some cases, the at least one VCSEL driver may be configured to control operation of the corresponding VCSEL by selecting a wavelength of the optical signal to be outputted by the corresponding VCSEL according to coarse wavelength division multiplexing (CWDM). The electro-optic transceiver module may further comprise a thermoelectric cooler (TEC) configured to remove heat from the plurality of VCSELs, and a TEC driver comprising driving circuitry configured to control operation of the TEC. For example, the microcontroller may be configured to selectively activate and deactivate the TEC based on the monitored temperature of at least one of the plurality of VCSELs to maintain a temperature of the at least one of the plurality of VCSELs within a certain range of predefined temperatures.

The electro-optic transceiver module, in some embodiments, may further comprise a plurality of TECs, each TEC being configured to remove heat from a corresponding VCSEL of the plurality of VCSELs, and at least one TEC drivers comprising driving circuitry configured to control operation of a corresponding TEC. The microcontroller may be configured to selectively activate and deactivate each TEC based on the monitored temperature of the corresponding VCSEL to maintain a temperature of the corresponding VCSEL within a certain range of predefined temperatures.

In some embodiments, the plurality of VCSELs may consist of four VCSELs. The plurality of VCSELs may be a first plurality of VCSELs, wherein the electro-optic transceiver module further comprises a second plurality of VCSELs, and wherein each of the first and second pluralities of VCSELs consists of two VCSELs. At least one VCSEL driver may, in some cases, be configured to detect a current of the corresponding VCSEL. The microcontroller may be configured to monitor a temperature of each VCSEL by receiving an indication of the current detected by the at least one VCSEL driver and determining a temperature of the corresponding VCSEL based on the respective indication of current.

In other embodiments, a method of transmitting multiple optical signals at different wavelengths over a single optical fiber is provided, the method comprising: using a plurality of vertical-cavity surface-emitting lasers (VCSELs) to convert a plurality of electrical signals to corresponding optical signals, wherein each electrical signal is provided to a respective VCSEL via a corresponding VCSEL driver, and wherein each optical signal has a wavelength that is different from a wavelength of every other optical signal of the plurality of VSCELs. The method may further include receiving at an optical multiplexer the optical signals from the plurality of VCSELs; combining, via the optical multiplexer, the optical signals into a single combined optical signal comprising multiple wavelengths; transmitting the single combined optical signal through a single optical fiber; and monitoring a temperature of each VCSEL of the plurality of VCSELs. The monitored temperature of each VCSEL may be correlated to an actual wavelength of the corresponding optical signal transmitted by each respective VCSEL; an adjustment in a current supplied by the VCSEL driver to each respective VCSEL for which the actual wavelength of the optical signal transmitted is outside a tolerated band of desired wavelengths may be determined; and the adjustment may be communicated to each corresponding VCSEL driver.

In some cases, the wavelength of each optical signal to be outputted by the plurality of VCSELs may be selected according to coarse wavelength division multiplexing (CWDM). Additionally or alternatively, at least one thermoelectric cooler (TEC) may be used to remove heat from the plurality of VCSELs so as to maintain a temperature of the plurality of VCSELs within a certain range of predefined temperatures based on the monitored temperature of at least one of the plurality of VCSELs. For example, a current of each VCSEL may be detected using the corresponding VCSEL driver. In some cases, a temperature of each VCSEL of the plurality of VCSELs may be monitored by receiving an indication of the current detected by the VCSEL driver and determining a temperature of the corresponding VCSEL based on the respective indication of current.

In still other embodiments, a method of manufacturing an electro-optic transceiver module is provided that comprises: providing a plurality of vertical-cavity surface-emitting lasers (VCSELs), wherein each VCSEL is configured to convert an electrical signal to a corresponding optical signal for transmission through a fiber optic cable; connecting at least one VCSEL driver to the plurality of VCSELs, wherein the at least one VCSEL driver comprises driving circuitry and is configured to control operation of a corresponding VCSEL of the plurality of VCSELs such that each optical signal has a wavelength that is different from a wavelength of every other optical signal of the plurality of VSCELs; and coupling an optical multiplexer to the plurality of VCSELs. The optical multiplexer may be configured to receive a plurality of optical signals from the plurality of VCSELs, combine the plurality of optical signals into a single combined optical signal comprising multiple wavelengths, and transmit the single combined optical signal through a single optical fiber. The method may further comprise connecting a microcontroller to the at least one VCSEL driver, wherein the microcontroller is configured to monitor a temperature of each VCSEL, correlate the monitored temperature of each VCSEL to an actual wavelength of the corresponding optical signal transmitted by each respective VCSEL, determine an adjustment in a current supplied by the at least one VCSEL driver to each respective VCSEL for which the actual wavelength of the optical signal transmitted is outside a tolerated band of desired wavelengths, and communicate the adjustment to the at least one VCSEL driver.

In some cases, the at least one VCSEL driver may be configured to control operation of the corresponding VCSELs by selecting a wavelength of the optical signal to be outputted by each corresponding VCSEL according to coarse wavelength division multiplexing (CWDM). The method may further comprise providing a thermoelectric cooler (TEC) proximate the plurality of VCSELs, wherein the TEC is configured to remove heat from the plurality of VCSELs, and connecting a TEC driver to the TEC, wherein the TEC driver comprises driving circuitry configured to control operation of the TEC, and wherein the microcontroller is configured to selectively activate and deactivate the TEC based on the monitored temperature of at least one of the plurality of VCSELs to maintain a temperature of the at least one of the plurality of VCSELs within a certain range of predefined temperatures.

In some embodiments, a plurality of TECs may be provided, wherein each TEC is mounted proximate a corresponding VCSEL of the plurality of VCSELs and is configured to remove heat from the corresponding VCSEL, and at least one TEC driver may be connected to the plurality of TECs, the at least one TEC driver comprising driving circuitry configured to control operation of a corresponding TEC. The microcontroller may be configured to selectively activate and deactivate each TEC based on the monitored temperature of the corresponding VCSEL to maintain a temperature of the corresponding VCSEL within a certain range of predefined temperatures.

The plurality of VCSELs may, in some cases, consist of four VCSELs. In some cases, the plurality of VCSELs may be a first plurality of VCSELs, and the method may further comprise providing a second plurality of VCSELs. Each of the first and second pluralities of VCSELs may consist of two VCSELs. In some embodiments, the at least one VCSEL driver may be configured to detect a current of the corresponding VCSEL, and the microcontroller may be configured to monitor a temperature of each VCSEL by receiving an indication of the current detected by the at least one VCSEL driver and determining a temperature of the corresponding VCSEL based on the respective indication of current.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In datacenters that use conventional single mode fiber (SMF) single channel architecture, the bandwidth per cross-section of the optical fiber is limited to the maximum bandwidth per electro/optical VCSEL-based channel, and the SMF single channel infrastructure supports only one wavelength per channel. With small form-factor pluggables (SFP), which plug into network switches and convert serial electrical signals to serial optical signals, a single electrical port is connected to a single optical port. Alternatively, quad small form-factor pluggables (QSFP) may be used, which connect four electrical ports to four optical ports in each direction (transmitting and receiving) use 8 fibers per cable (e.g., four fibers in each direction). This results in higher bandwidth (at a higher infrastructure cost), but lower bandwidth per cable cross-section. As another approach, wavelength division multiplexing (WDM) and coarse wavelength division multiplexing (CWDM) using silicon photonics (SiP) transceivers are expected to be launched; however, the total cost of this solution is high, the reliability is as yet unknown, and the assembly of such components is very complex.

Conventional edge-emitting lasers (EMLs) have been used to generate optical signals at wavelengths according to CWDM; however, EMLs generally require 3.5 W of power to operate, which is higher than the power required for generating optical signals using a VCSEL.

According to embodiments of the invention described herein, a multiple of the maximum bandwidth of a VCSEL can be transmitted through a single SMF fiber, depending on the number of different wavelengths used. In particular, embodiments of the invention described herein enable a certain number of electrical ports (e.g., data channels) for a communication cable (regardless of the form-factor) to transmit data via a number of optical fiber channels that is smaller than the number of electrical channels. This is accomplished by using different wavelengths for optical data transmission, such as according to CWDM, while at the same time using VCSELs to generate the optical signals. Although previous attempts to use VCSELs to accomplish similar results have been unsuccessful due to the challenges inherent in maintaining a precise wavelength of the outputted optical signal, embodiments of the present invention compensate for fluctuations in the VCSEL's performance (e.g., due to temperature changes of the VCSEL) by adjusting the bias current of the VCSEL driver, as described in greater detail below. As a result, embodiments of the invention should significantly reduce the costs of cables and increase the bandwidth per cross-section that is possible.

Figure 1:
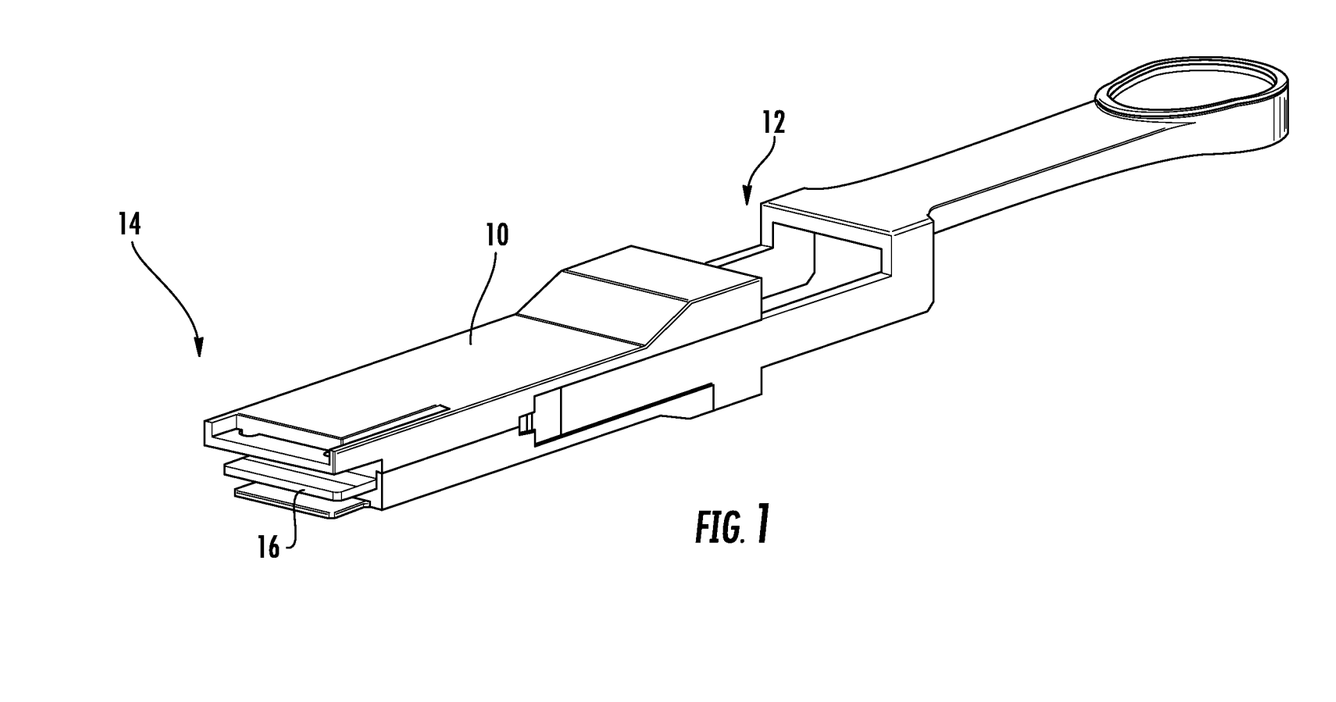
FIG. 1 is a perspective view of a housing for an electro-optic interface according to an example embodiment.

With reference to FIG. 1, an electro-optic interface, which includes an electro-optic transceiver module as well as other components (not shown for clarity), is typically enclosed in a housing 10. External optical cables (not shown) may be received at one end 12 of the housing 10 of the electro-optic interface, such as via an optical ferrule holder, and electrical connections may be made at the other end 14 of the housing 10, such as via a printed circuit board (PCB) connector port 16.

Figure 2:
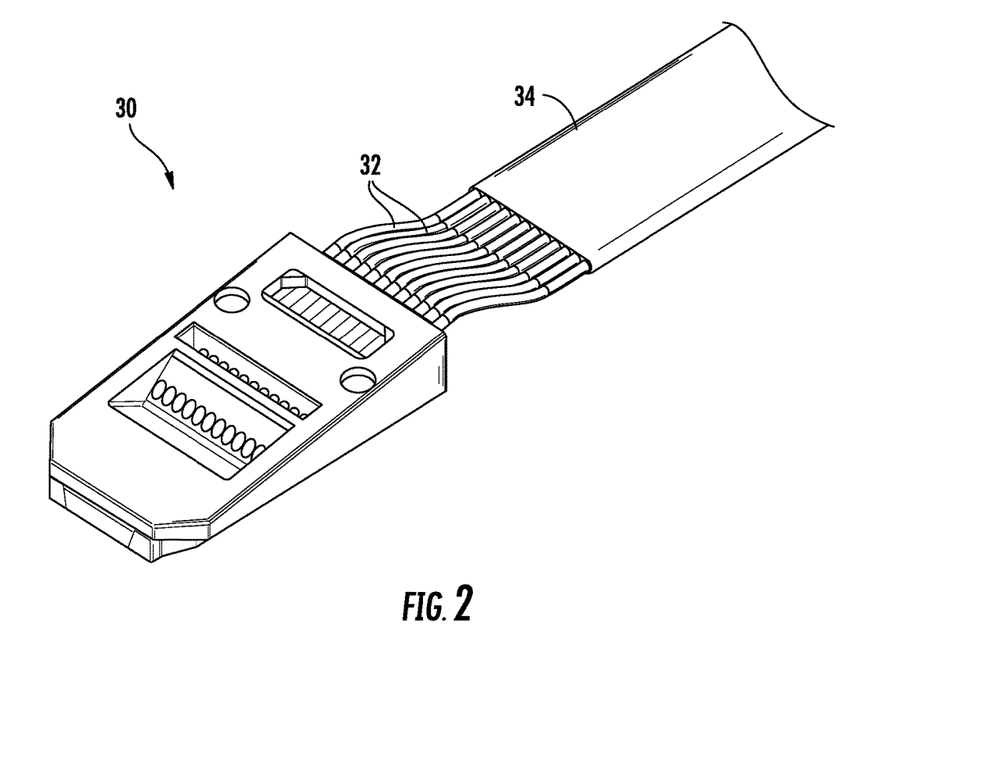
FIG. 2 is a perspective view of an electro-optic interface according to an example embodiment.

FIG. 2 shows the electro-optic interface 30, which may be disposed in a housing 10 such as that shown in FIG. 1. The electro-optic interface 30 may be configured to transmit optical signals via optical fibers 32 of an internal optical cable 34 based on electrical signals received via the PCB connector port 16 shown in FIG. 1. Likewise, the electro-optic interface 30 may be configured to receive optical signals via the optical fibers 32 of the internal optical cable 34 and transmit corresponding electrical signals via the PCB connector port 16.

In this regard, the electro-optic interface 30 may comprise an electro-optic transceiver module, which may be supported on a printed circuit board (PCB) assembly (not shown). The electro-optic transceiver module 40, illustrated schematically in FIG. 3, may allow for the interconnection of the optical fibers 32 (FIG. 2) and the PCB connector port 16 (FIG. 1) and may be configured to convert between optical signals and the corresponding electrical signals for respectively transmitting or receiving optical signals through the fiber optic cables 32.

Figure 3:
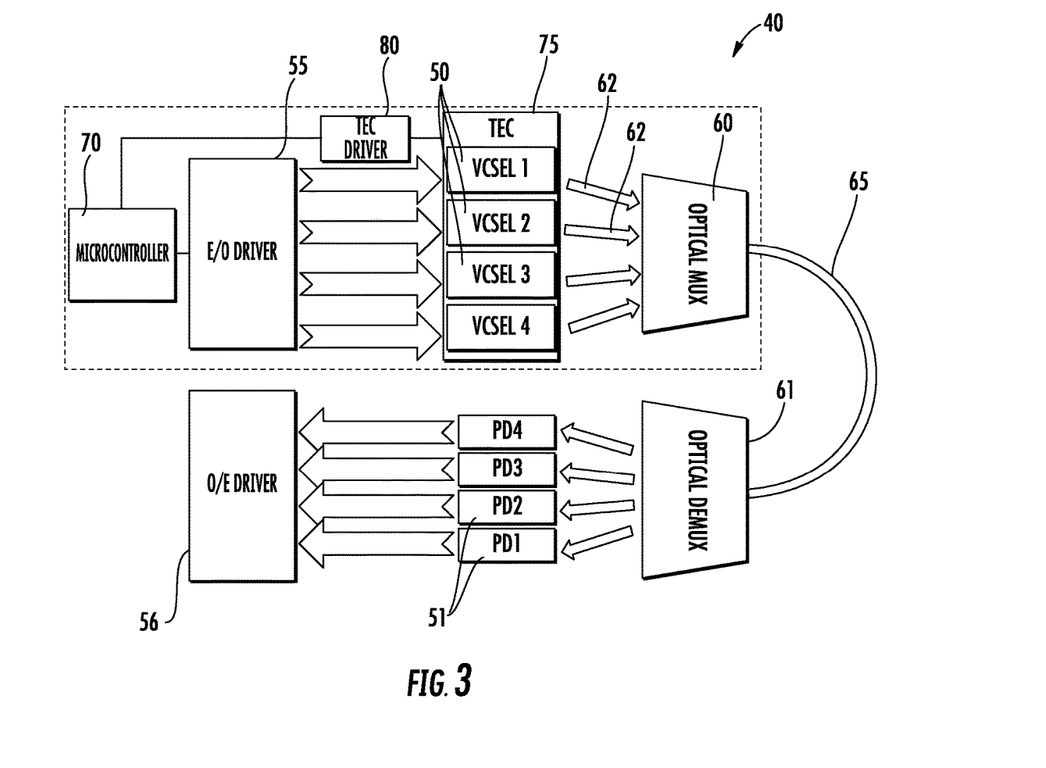
FIG. 3 is a schematic illustration of a uni-directional electro-optic link with a single TEC for all of the VCSELs according to an example embodiment.

For example, the electro-optic transceiver module 40 may include a photodetector (PD) and/or a VCSEL. The PD may be configured to detect light for converting the optical signals received via the optical fibers 32 into electrical signals for transmission via the PCB connector port 16. The VCSEL may be configured to convert electrical signals received via the PCB connector port 16 into optical signals for transmission via the optical fibers 32. The PD and the VCSEL may be connected to the PCB assembly via respective dies.

Turning to FIG. 3, embodiments of the present invention provide an electro-optic transceiver module 40 that includes a plurality of VCSELs 50, each VCSEL being configured to convert an electrical signal to a corresponding optical signal for transmission through a fiber optic cable. In FIG. 3, for example, the electro-optic transceiver module 40 includes four VCSELs 50, labeled VCSEL 1, VCSEL 2, VCSEL 3, and VCSEL 4. The electro-optic transceiver module 40 further includes at least one VCSEL driver 55 that includes driving circuity and is configured to control operation of a corresponding VCSEL 50 (or multiple VCSELs) such that each optical signal has a wavelength that is different from a wavelength of every other optical signal of the plurality of VCSELs. In some cases, a single VCSEL driver may be provided for controlling the operation of all of the VCSELs 50 in the array, such that in the example of FIG. 3, one VCSEL driver would control 4 VCSELS in a 1×4 configuration. In other cases, however, a VCSEL driver may be provided for each VCSEL 50, such that in the example shown in FIG. 3, four VCSEL drivers would be provided, each VCSEL driver controlling a particular VCSEL (e.g., a 4×4 configuration). Other configurations (e.g., one VCSEL driver for each pair of VCSELs, etc.) may also be used, as appropriate.

In some embodiments, the VCSEL driver 55 may be configured to control operation of the VCSELs 50 by selecting a wavelength of the optical signal to be outputted by the corresponding VCSEL(s) according to coarse wavelength division multiplexing (CWDM). In CWDM, for example, 16 channels are provided between wavelengths of 1270 nm and 1610 nm, with the wavelengths being selected having a channel spacing of about 20 nm and a width of about 13 nm. For the optical signals being transmitted in one direction, the wavelengths selected may be about 1270 nm, 1290 nm, 1310 nm, and 1330 nm, as an example. Optical signals travelling in the opposite direction may have wavelengths of about 1550 nm, 1570 nm, 1590 nm, and 1610 nm. Where additional channels are provided, the wavelengths selected may be spaced at about 20 nm increments between 1330 nm and 1550 nm. Thus, in the example illustrated in FIG. 3, the VCSEL driver 55 may cause the VCSELs to transmit optical signals at the following nominal wavelengths: VCSEL 1 at 1270 nm; VCSEL 2 at 1290 nm, VCSEL 3 at 1310 nm, and VCSEL 4 at 1330 nm.

The electro-optic transceiver module 40 may further include an optical multiplexer 60 coupled to the plurality of VCSELs, as shown in FIG. 3. The optical multiplexer 60 may be configured to receive a plurality of optical signals 62 from the plurality of VCSELs (four optical signals in the depicted example) and to combine the plurality of optical signals into a single combined optical signal comprising multiple wavelengths. Each VCSEL 50 may be coupled to the optical multiplexer 60 via a coupling (e.g., a prism) that is capable of rotating the optical signal (e.g., the beam of light) generated by the VCSEL by 90° for receipt by the optical multiplexer. The single combined optical signal may then be transmitted through a single optical fiber 65 from the transmitting end of the system to an optical demultiplexer 61 in an optoelectronic transceiver module at a receiving end of the system. The optical demultiplexer 61 may demultiplex (e.g., uncombined) the combined optical signal into its constituent wavelengths for transmission to respective photodetectors (PDs) 51. The optical demultiplexer 61 may be coupled to the PDs 51 via a 90° coupling, as described above. The PDs 51, in turn, may be configured to convert the respective optical signals back into electrical signals, such as via communication with a PD driver 56 (e.g., a transimpedance amplifier (TIA)).

With continued reference to FIG. 3, the electro-optic transceiver module 40 (e.g., at the transmitting end) may further include a microcontroller 70 that is configured to monitor a temperature of each VCSEL 50, correlate the monitored temperature of each VCSEL to an actual wavelength of the corresponding optical signal 62 transmitted by each respective VCSEL, and determine an adjustment in a current supplied by the at least one VCSEL driver 55 to each respective VCSEL for which the actual wavelength of the optical signal transmitted is outside a tolerated band of desired wavelengths. For example, as described above, an increased temperature of a VCSEL 50 (due to heat generated by the VCSEL driver 55 or other components in the environment of the VCSEL during operation) may cause the wavelength of the optical signal 62 outputted by that VCSEL to change, such that the wavelength that is instructed by the VCSEL driver is different from the wavelength of the optical signal that is actually transmitted by the VCSEL. The amount of variance that is tolerated or considered to be in a range of acceptable wavelengths may be dependent on (e.g., defined by) the configuration of the optical multiplexer 60. For example, the optical multiplexer may be associated with a Wavelength Division Multiplexer (WDM) specification, which may define a range of acceptable wavelengths as, for example, between approximately 2 nm and 20-30 nm. The tolerated range of wavelengths may, for example, be different when considering a Dense Wavelength Division Multiplexing (DWDM) scheme versus Coarse Wavelength Division Multiplexing (CWDM) scheme.

In other words, if the VCSEL driver 55 provided an electrical signal to VCSEL 1 at a particular current for instructing VCSEL 1 to generate an optical signal 62 that is 1270 nm (as an example), an elevated temperature of the VCSEL may cause the actual outputted optical signal 62 to have a wavelength of 1255 nm. By determining that the temperature of the VCSEL 50 (VCSEL 1 in this example) is elevated by, for example, 5° C., however, the microcontroller is able to calculate the actual wavelength of the corresponding optical signal 62 outputted by the VCSEL and determine how to modify the current provided by the VCSEL driver 55 to compensate for the wavelength variation occurring at the VCSEL due to the elevated temperature. In this way, if the variation in the wavelength of the actual outputted optical signal as compared to the desired wavelength is outside a certain tolerated band of wavelengths, the adjustment determined by the microcontroller may be communicated to the corresponding VCSEL driver 55 to compensate for the variation and produce an adjusted optical signal 62 that is closer to the desired wavelength (e.g., the desired wavelength of 1270 nm, in this example).

The adjustment determined by the microcontroller 70 may, in some embodiments, be determined with reference to a software algorithm that models a phase diagram having calibration points that take into account the general relationship between current and power supplied to the VCSEL at various temperatures and between current supplied and resulting wavelength at various temperatures of the VCSEL. This data can be generalized to a specific VCSEL at the stage of wafer probing at the initial testing of the VCSEL, which can be fed into a memory of the microcontroller 70. As an example, an increase in temperature may generally shift the current v. power curve down (decreased power), whereas the current v. wavelength curve may be shifted up with an increase in temperature (increased wavelength).

In some cases, the VCSEL driver 55 is configured to detect a current of the corresponding VCSEL 50 (and/or the plurality of VCSELs). The microcontroller 70, in turn, may be configured to monitor the temperature of the VCSELs 50 by receiving an indication of the current detected by the VCSEL driver 55 and determining a temperature of the corresponding VCSEL based on the respective indication of current.

Figure 4:
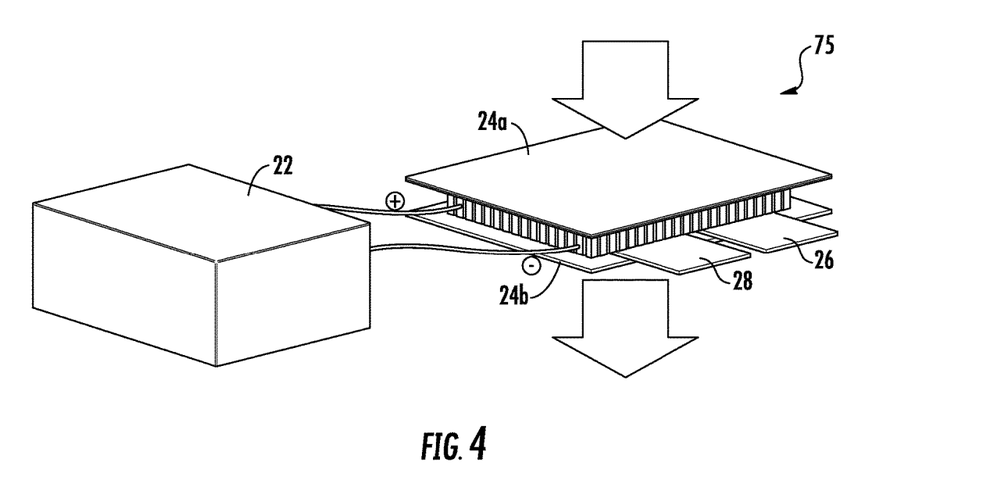
FIG. 4 is a schematic illustration of a thermoelectric cooler (TEC) according to an example embodiment.

Moreover, in some embodiments, the electro-optic transceiver module 40 may further comprise a thermoelectric cooler (TEC) 75 that is configured to remove heat from the plurality of VCSELs 50, as well as a TEC driver 80 that includes driving circuitry configured to control operation of the TEC. A TEC is a solid-state heat pump that uses the Peltier effect to provide cooling. FIG. 4, for example, provides a simplified schematic illustration of a TEC 75. In particular, electric current (e.g., from a direct current (DC) power source 22) is passed through two conductors 24a, 24b (e.g., ceramic substrates). An array of p- and n-type semiconductor elements 26, 28 is provided between the two substrates 24a, 24b, with the elements 26, 28 connected to the substrates electrically in series and thermally in parallel. As the current passes through one or more pairs of elements 26, 28, the temperature of the substrate 24a at the junction of the dissimilar semiconductor elements 26, 28 decreases, creating a heat sink. The heat is carried through the TEC 75 via electron transport and is released at the substrate 24b on the opposite side of the array of elements 26, 28 as the electrons move back from a high-energy state to a low-energy state.

Referring again to FIG. 3, the microcontroller 70 may be configured to selectively activate and deactivate the TEC 75 based on the monitored temperature of at least one of the plurality of VCSELs 50 to maintain a temperature of the at least one of the plurality of VCSELs within a certain range of predefined temperatures. For example, the microcontroller 70 may be configured to maintain the temperature of the VCSELs 50 at approximately 55° C.–60° C., and as such, the microcontroller may activate the TEC 75 to cool the VCSELs when the monitored temperature is greater than the desired range of temperatures (e.g., greater than 60° C.) and may deactivate the TEC to cease cooling the VCSELs when the monitored temperature is less than the desired range of temperatures (e.g., less than 55° C.).

Figure 5:
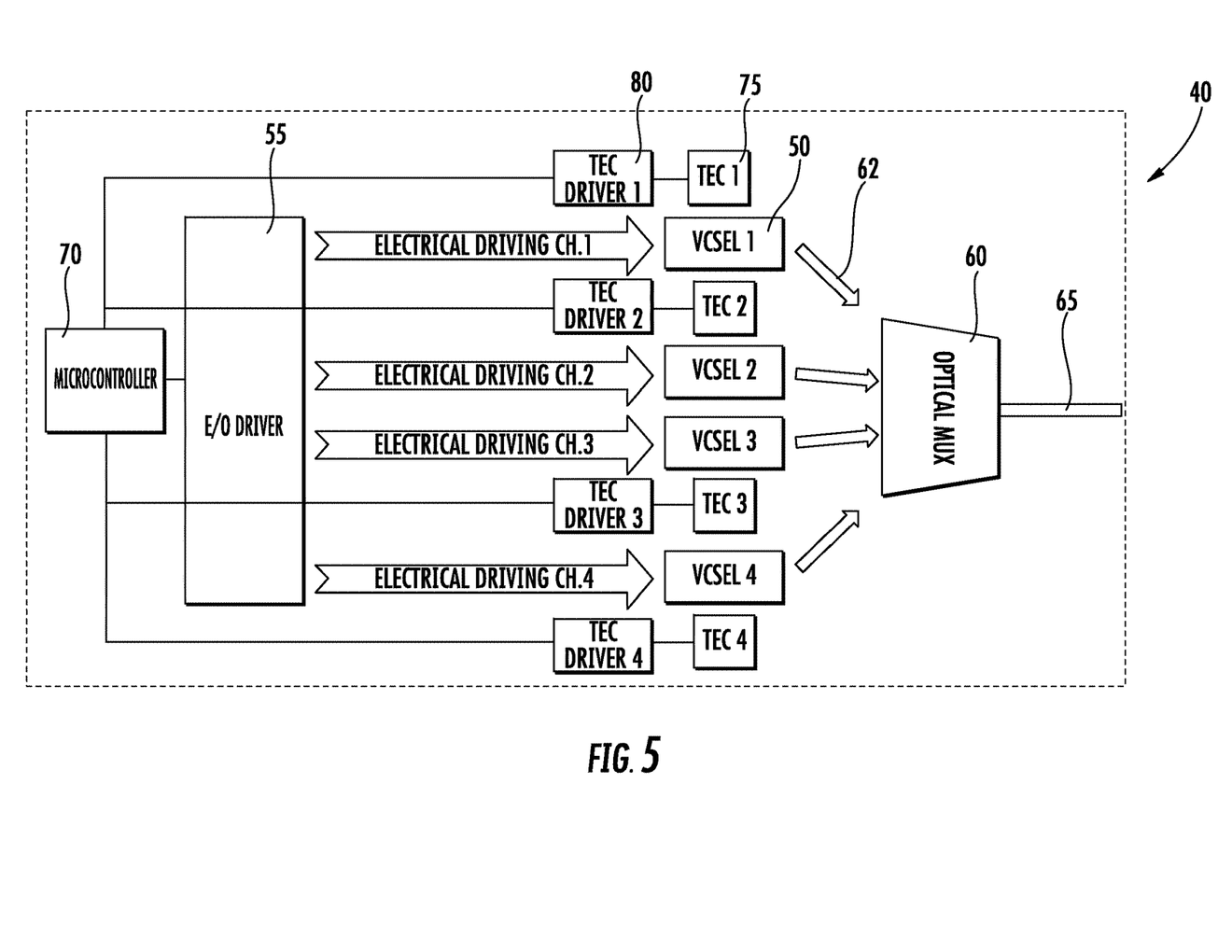
FIG. 5 is a schematic illustration of a uni-directional electro-optic link with a TEC provided for each VCSEL according to another example embodiment.

In some embodiments, instead of having a single TEC 75 that is configured to remove heat from all of the VCSELs 50, each VCSEL may have a dedicated TEC, which may in turn have a dedicated TEC driver 80 in communication with the microcontroller 70, as illustrated in FIG. 5. Thus, in FIG. 5, which shows only the electro-optic transceiver module 40 at the transmitting end of the system, four TECs 75 (e.g., TEC 1, TEC 2, TEC 3, and TEC 4) and four TEC drivers 80 (TEC driver 1, TEC driver 2, TEC driver 3, and TEC driver 4) are provided. In this regard, each TEC 75 may be configured to remove heat from a corresponding VCSEL 50 of the plurality of VCSELs, and each TEC driver 80 may comprise driving circuitry that is configured to control operation of a corresponding TEC. The microcontroller 70 may thus be configured to selectively activate and deactivate each TEC 75 based on the monitored temperature of the corresponding VCSEL 50 to maintain a temperature of the corresponding VCSEL within a certain range of predefined temperatures, as described above. In some embodiments, however, a single TEC driver 80 may be configured to control operation of multiple TECs 75.

In embodiments such as that shown in FIG. 5, the use of a plurality of dedicated TECs 75 may thus allow for finer controller of the temperature of the corresponding VCSELs 50, thereby allowing each VCSEL to be maintained at a more steady temperature and minimizing the variations in wavelength of the optical signals 62 outputted by the VCSELs that may otherwise occur. Single-mode (SM) VCSELs, for example, may be ultra-sensitive to temperature, and thus embodiments of the invention may be useful in allowing SM VCSELs to be functional in all datacenter conditions (e.g., regardless of the different temperatures in various locations within the datacenter).

Figure 6:
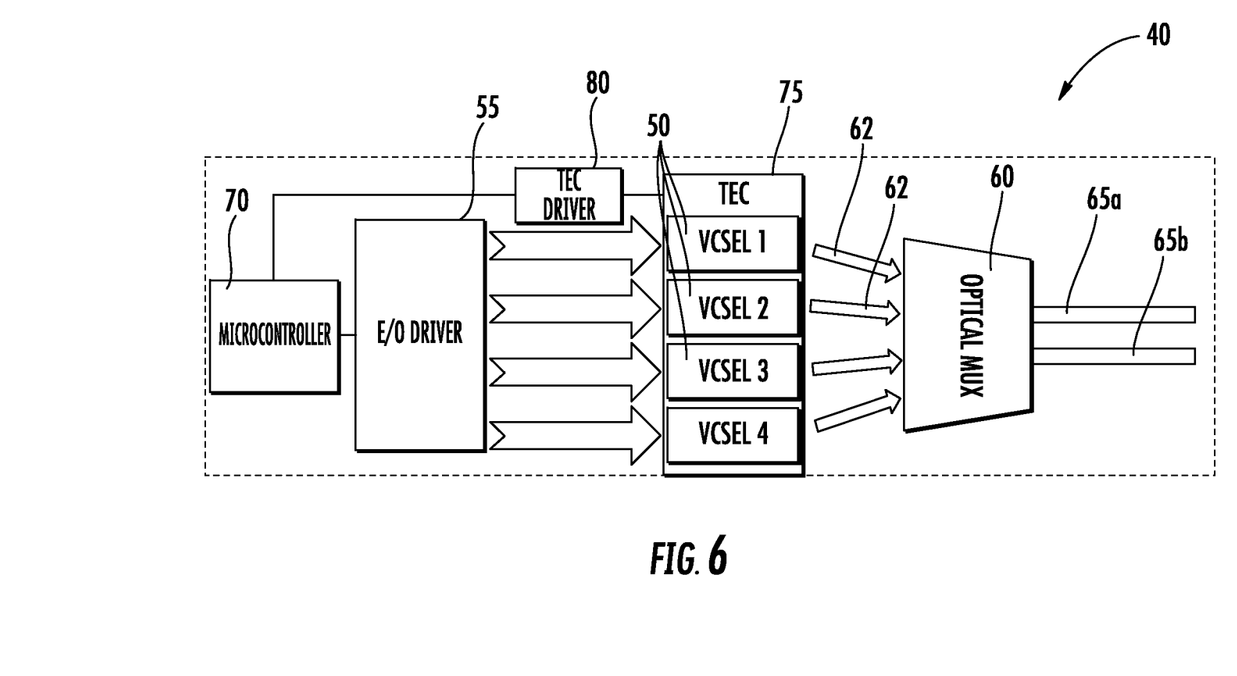
FIG. 6 is a schematic illustration of a uni-directional electro-optic link in a dual mode fiber (DMF) configuration according to an example embodiment.

As described above with respect to FIG. 4, in some embodiments the electro-optic transceiver module has four VCSELs 50 that generate optical signals at different wavelength, and the four optical signals are combined by the optical multiplexer into a single combined optical signal for transmission via a single optical fiber (e.g., SMF). In other embodiments, however, such as shown in FIG. 6, the plurality of VCSELs 50 is a first plurality of VCSELs (e.g., VCSEL 1 and VCSEL 2), and the electro-optic transceiver module further comprises a second plurality of VCSELs (e.g., VCSEL 3 and VCSEL 4), such that each of the first and second pluralities of VCSELs consists of two VCSELs, and the optical signals from each pair of VCSELs is transmitted over a different optical fiber (e.g., a dual mode fiber DMF).

In this way, embodiments of the present invention may allow four optical signals generated based on electrical signals from four different electrical channels to be combined for transmission over two optical fibers (4→2) or four optical signals generated based on electrical signals from four different electrical channels to be combined for transmission over a single optical fiber (4→1). Moreover, although the examples described above and illustrated in the figures show four optical signals generated based on electrical signals from four different electrical channels, embodiments of the present invention are not limited to only four different electrical channels. In some embodiments, for example, six or eight or more optical signals generated based on electrical signals from six or eight or more different electrical channels, respectively, to be combined for transmission over two optical fibers or one optical fiber, or any number of optical fibers that is smaller than the number of electrical channels (M→N, where M is the number of electrical channels, N is the number of optical fibers, and N<M).

Figure 7:
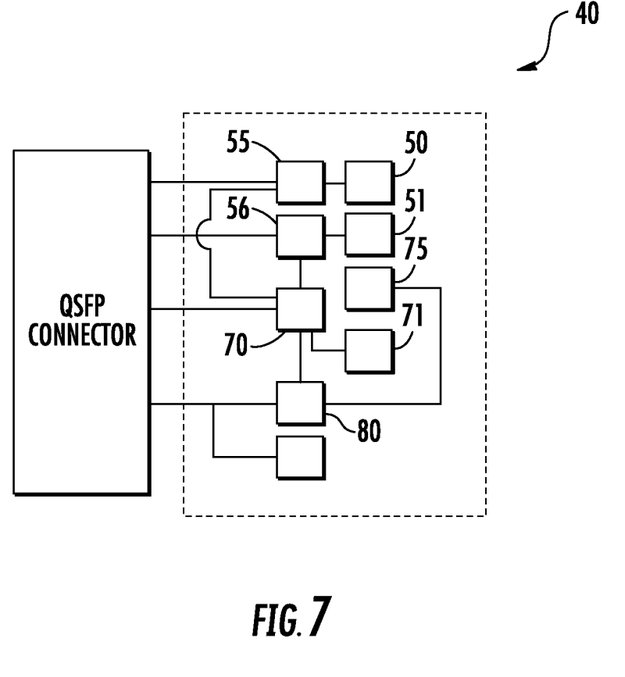
FIG. 7 is a schematic illustration of the electrical connections between components of a bi-directional electro-optic transceiver module according to an example embodiment.

FIG. 7 illustrates a schematic diagram of the electrical connections between various components of a bi-directional electro-optic transceiver module 40. As shown, the bi-directional electro-optic transceiver module 40 may include a microcontroller 70 that is in communication with a VCSEL driver 55, a PD driver 56, and a TEC driver 80, as well as various other components 71 of the PCB assembly, such as thermal diodes, sensors, etc. The VCSEL driver 55 may in turn be in communication with the plurality of VCSELs 50; the PD driver 56 may be in communication with the PDs 51, and the TEC driver 80 may be in communication with the TEC 75. Although not shown in FIG. 7, in some cases, the microcontroller 70 may also be in direct communication with the plurality of VCSELs 50, the PDs 51, and/or the TEC 75. The VCSEL driver 55, the PD driver 56, the microcontroller 70, and the TEC driver 80, in turn, may be connected to a respective port of a connector, such as a quad small form-factor pluggable (QSFP) connector, as shown. As described above, the optical signals generated by the VCSELs 50 may be transmitted to an optical multiplexer 60 (not shown in FIG. 7) for transmission via a single optical fiber, and the PDs 51 may receive optical signals from an optical demultiplexer 61 (not shown in FIG. 7) for conversion back into electrical signals (e.g. such as in the system shown in FIG. 3, for example).

Figure 8:
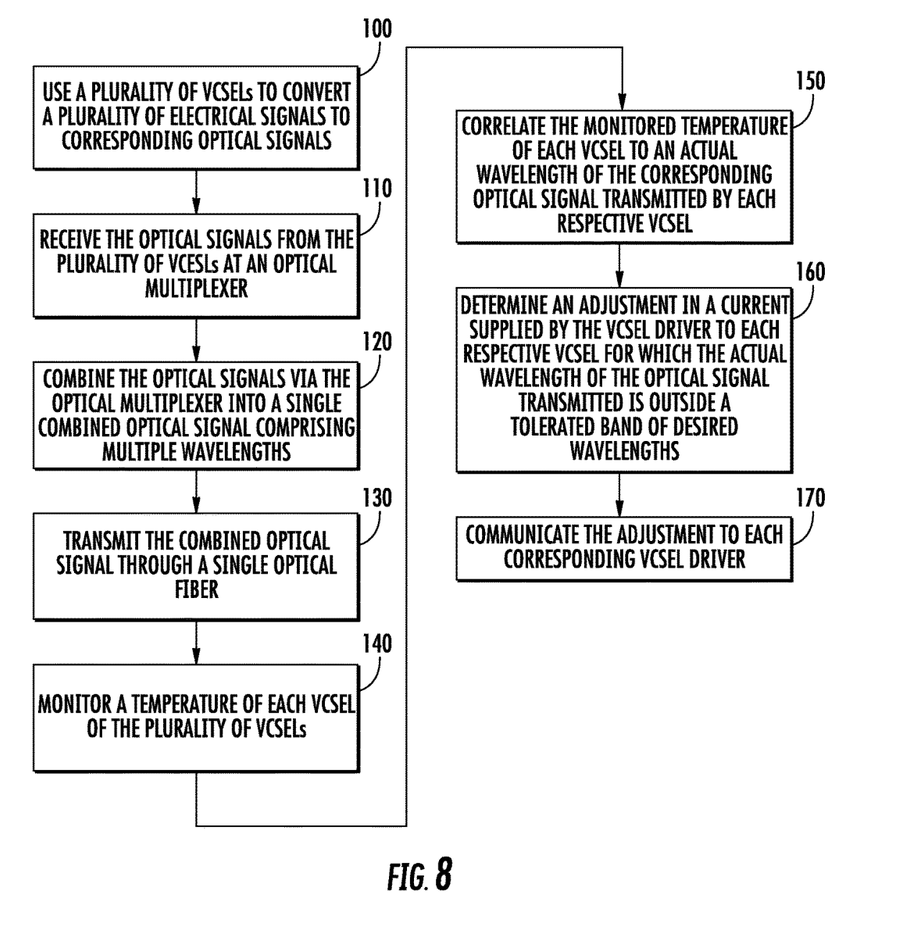
FIG. 8 illustrates a method of transmitting multiple optical signals at different wavelengths over a single fiber according to an example embodiment.

Accordingly, with respect to FIG. 8, in some embodiments, a method of transmitting multiple optical signals at different wavelengths over a single optical fiber is provided. The method comprises using a plurality of VCSELs to convert a plurality of electrical signals to corresponding optical signals at Block 100, where each electrical signal is provided to a respective VCSEL via a corresponding VCSEL driver (e.g., as described above with respect to FIGS. 3, 5, and 6). Each optical signal has a wavelength that is different from a wavelength of every other optical signal of the plurality of VCSELs, such as in embodiments in which the wavelength of each optical signal to be outputted by the plurality of VCSELs is selected according to coarse wavelength division multiplexing (CWDM).

At Block 110, the optical signals from the plurality of VCSELs are received at an optical multiplexer, and at Block 120, the optical signals are combined via the optical multiplexer into a single combined optical signal comprising multiple wavelengths. The single combined optical signal may then be transmitted through a single optical fiber at Block 130.

A temperature of each VCSEL of the plurality of VCSELs may be monitored at Block 140, such as by a microcontroller as described above, and the monitored temperature of each VCSEL may be correlated to an actual wavelength of the corresponding optical signal transmitted by each respective VCSEL at Block 150. An adjustment in a current supplied by the VCSEL driver to each respective VCSEL for which the actual wavelength of the optical signal transmitted is outside a tolerated band of desired wavelengths may be determined at Block 160, such as by the microcontroller as described above, and the adjustment may be communicated to each corresponding VCSEL driver to compensate for the detected variations in the wavelengths of the optical signals produced by the VCSELs at Block 170.

In some embodiments, as described above, at least one TEC may be used to remove heat from the plurality of VCSELs so as to maintain a temperature of the plurality of VCSELs within a certain range of predefined temperatures based on the monitored temperature of at least one of the plurality of VCSELs. Additionally or alternatively, a current of each VCSEL may be detected using the corresponding VCSEL driver, and in some cases the temperature of each VCSEL may be monitored by receiving (e.g., at the microcontroller) an indication of the current detected by the VCSEL driver and determining a temperature of the corresponding VCSEL based on the respective indication of current.

Accordingly, as described above with reference to FIGS. 1-8, an electro-optic transceiver module, method of manufacturing, and method of transmitting signals are provided that allow multiple optical signals at different wavelengths (e.g., according to a CWDM scheme) to be combined into a smaller number of optical signals for transmission. Embodiments as described above therefore allow the use of CWDM in connection with lower-cost VCSEL technology (e.g., as opposed to higher-cost edge-emitting lasers) by providing for wavelength compensation at the VCSEL driver to offset any changes in wavelength that may have otherwise occurred at the VCSELs. In this way, the power requirements for each electrical channel may be reduced from approximately 3.5 W (considering a system that uses edge-emitting lasers, for example) to approximately 2.5 W (considering the embodiments described above, which may also include a TEC for maintaining the VCSELs at a relatively constant temperature). Multiplied by the number of channels per switch and again by the number of switches supported within the datacenter, the costs savings associated with reducing the power consumption by 1 W per electrical channel in the data center is not insignificant.

Many modifications and other embodiments of the inventions set forth herein will come to mind to one skilled in the art to which these inventions pertain having the benefit of the teachings presented in the foregoing descriptions and the associated drawings. Although the figures only show certain components of the apparatus and systems described herein, it is understood that various other components (e.g., components that would normally be mounted on the PCB assembly as part of the electro-optic transceiver module and/or the optoelectronic transceiver module) may also be part of the described system. Moreover, although certain configurations of the electro-optic transceiver module are shown, such as uni-directional transmission of data from four electrical channels in an SMF system and in a DMF system, it would be understood by one skilled in the art that the examples and configurations provided herein may be simplified for purposes of explanation, and embodiments of the invention described herein may be equally applicable in bi-directional systems having other than four electrical channels transmitting data over one, two, three, or more optical fibers.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. For example, it is noted that the term "electro-optic" may be used interchangeably with "electro/optical." Moreover, although embodiments of the invention described herein refer to electro-optic transceiver modules with respect to groups of components that cooperatively convert electrical signals to optical signals and likewise refer to optoelectronic transceiver modules with respect to groups of components that cooperatively convert optical signals into electrical signals, it is understood in light of this disclosure that in some configurations a module may have components that convert electrical signals to optical signals for transmission in one direction and may also have components that convert optical signals to electrical signals upon receipt of the optical signals in the opposite direction. Accordingly, in such cases, the terms electro-optic and optoelectronic may be used interchangeably to refer to the combined groupings of components.

What is claimed is:

1. An electro-optic transceiver module comprising:
    a plurality of vertical-cavity surface-emitting lasers (VCSELs), wherein each VCSEL is configured to convert an electrical signal to a corresponding optical signal for transmission through a fiber optic cable;
    at least one VCSEL driver comprising driving circuitry and configured to control operation of a corresponding VCSEL of the plurality of VCSELs such that each optical signal has a wavelength that is different from a wavelength of every other optical signal of the plurality of VCSELs;
    an optical multiplexer coupled to the plurality of VCSELs, wherein the optical multiplexer is configured to:
        receive a plurality of optical signals from the plurality of VCSELs,
        combine the plurality of optical signals into a single combined optical signal comprising multiple wavelengths, and
        transmit the single combined optical signal through a single optical fiber; and
    a microcontroller configured to:
        independently monitor a temperature of each VCSEL,
        correlate the monitored temperature of each VCSEL to an actual wavelength of the corresponding optical signal transmitted by each respective VCSEL,
        based only on the correlation, determine an adjustment in a current supplied by the at least one VCSEL driver to each respective VCSEL for which the actual wavelength of the optical signal transmitted is outside a tolerated band of desired wavelengths, and
        communicate the adjustment to the at least one VCSEL driver, wherein the adjustment to the at least one VCSEL driver maintains the single combined optical signal within a tolerated band of desired multiplex wavelengths.

2. The electro-optic transceiver module of claim 1, wherein the at least one VCSEL driver is configured to control operation of the corresponding VCSEL by selecting a wavelength of the optical signal to be outputted by the corresponding VCSEL according to coarse wavelength division multiplexing (CWDM).

3. The electro-optic transceiver module of claim 1 further comprising a thermoelectric cooler (TEC) configured to remove heat from the plurality of VCSELs, and a TEC driver comprising driving circuitry configured to control operation of the TEC, wherein the microcontroller is configured to selectively activate and deactivate the TEC based on the monitored temperature of at least one of the plurality of VCSELs to maintain a temperature of the at least one of the plurality of VCSELs within a certain range of predefined temperatures.

4. The electro-optic transceiver module of claim 1 further comprising a plurality of TECs, each TEC configured to remove heat from a corresponding VCSEL of the plurality of VCSELs, and at least one TEC driver comprising driving circuitry configured to control operation of one or more corresponding TECs, wherein the microcontroller is configured to selectively activate and deactivate each TEC based on the monitored temperature of the corresponding VCSEL to maintain a temperature of the corresponding VCSEL within a certain range of predefined temperatures.

5. The electro-optic transceiver module of claim 1, wherein the plurality of VCSELs consists of four VCSELs.

6. The electro-optic transceiver module of claim 1, wherein the plurality of VCSELs is a first plurality of VCSELs, wherein the electro-optic transceiver module further comprises a second plurality of VCSELs, and wherein each of the first and second pluralities of VCSELs consists of two VCSELs.

7. The electro-optic transceiver module of claim 1, wherein the at least one VCSEL driver is configured to detect a current of the corresponding VCSEL.

8. The electro-optic transceiver module of claim 7, wherein the microcontroller is configured to monitor a temperature of each VCSEL by receiving an indication of the current detected by the at least one VCSEL driver and determining a temperature of the corresponding VCSEL based on the respective indication of current.

9. A method of transmitting multiple optical signals at different wavelengths over a single optical fiber, the method comprising:
  using a plurality of vertical-cavity surface-emitting lasers (VCSELs) to convert a plurality of electrical signals to corresponding optical signals, wherein each electrical signal is provided to a respective VCSEL via a corresponding VCSEL driver, and wherein each optical signal has a wavelength that is different from a wavelength of every other optical signal of the plurality of VSCELs;
  receiving at an optical multiplexer the optical signals from the plurality of VCSELs; combining, via the optical multiplexer, the optical signals into a single combined optical signal comprising multiple wavelengths;
  transmitting the single combined optical signal through a single optical fiber;
  independently monitoring a temperature of each VCSEL of the plurality of VCSELs;
  correlating the monitored temperature of each VCSEL to an actual wavelength of the corresponding optical signal transmitted by each respective VCSEL;
  based only on the correlation, determining an adjustment in a current supplied by the VCSEL driver to each respective VCSEL for which the actual wavelength of the optical signal transmitted is outside a tolerated band of desired wavelengths; and
  communicating the adjustment to each corresponding VCSEL driver, wherein the adjustment to the at least one VCSEL driver maintains the single combined optical signal within a tolerated band of desired multiplex wavelengths.

10. The method of claim 9, wherein the wavelength of each optical signal to be outputted by the plurality of VCSELs is selected according to coarse wavelength division multiplexing (CWDM).

11. The method of claim 9 further comprising using at least one thermoelectric cooler (TEC) to remove heat from the plurality of VCSELs so as to maintain a temperature of the plurality of VCSELs within a certain range of predefined temperatures based on the monitored temperature of at least one of the plurality of VCSELs.

12. The method of claim 9 further comprising detecting a current of each VCSEL using the corresponding VCSEL driver.

13. The method of claim 12, wherein monitoring a temperature of each VCSEL of the plurality of VCSELs comprises receiving an indication of the current detected by the VCSEL driver and determining a temperature of the corresponding VCSEL based on the respective indication of current.

14. A method of manufacturing an electro-optic transceiver module comprising:
  providing a plurality of vertical-cavity surface-emitting lasers (VCSELs), wherein each VCSEL is configured to convert an electrical signal to a corresponding optical signal for transmission through a fiber optic cable;
  connecting at least one VCSEL driver to the plurality of VCSELs, wherein the at least one VCSEL driver comprises driving circuitry and is configured to control operation of a corresponding VCSEL of the plurality of VCSELs such that each optical signal has a wavelength that is different from a wavelength of every other optical signal of the plurality of VSCELs;
  coupling an optical multiplexer to the plurality of VCSELs, wherein the optical multiplexer is configured to:
    receive a plurality of optical signals from the plurality of VCSELs,
    combine the plurality of optical signals into a single combined optical signal comprising multiple wavelengths, and
    transmit the single combined optical signal through a single optical fiber; and
  connecting a microcontroller to the at least one VCSEL driver, wherein the microcontroller is configured to:
    independently monitor a temperature of each VCSEL,
    correlate the monitored temperature of each VCSEL to an actual wavelength of the corresponding optical signal transmitted by each respective VCSEL,
    based only on the correlation, determine an adjustment in a current supplied by the at least one VCSEL driver to each respective VCSEL for which the actual wavelength of the optical signal transmitted is outside a tolerated band of desired wavelengths, and
    communicate the adjustment to the at least one VCSEL driver, wherein the adjustment to the at least one VCSEL driver maintains the single combined optical signal within a tolerated band of desired multiplex wavelengths.

15. The method of claim 14, wherein the at least one VCSEL driver is configured to control operation of the corresponding VCSELs by selecting a wavelength of the optical signal to be outputted by each corresponding VCSEL according to coarse wavelength division multiplexing (CWDM).

16. The method of claim 14 further comprising providing a thermoelectric cooler (TEC) proximate the plurality of VCSELs, wherein the TEC is configured to remove heat from the plurality of VCSELs, and connecting a TEC driver to the TEC, wherein the TEC driver comprises driving circuitry configured to control operation of the TEC, and wherein the microcontroller is configured to selectively activate and deactivate the TEC based on the monitored temperature of at least one of the plurality of VCSELs to maintain a temperature of the at least one of the plurality of VCSELs within a certain range of predefined temperatures.

17. The method of claim 14 further comprising providing a plurality of TECs, wherein each TEC is mounted proximate a corresponding VCSEL of the plurality of VCSELs and is configured to remove heat from the corresponding VCSEL, and connecting at least one TEC driver to one or more of the plurality of TECs, the at least one TEC driver comprising driving circuitry configured to control operation of one or more corresponding TECs, wherein the microcontroller is configured to selectively activate and deactivate each TEC based on the monitored temperature of the corresponding VCSEL to maintain a temperature of the corresponding VCSEL within a certain range of predefined temperatures.

18. The method of claim 14, wherein the plurality of VCSELs consists of four VCSELs.

19. The method of claim 14, wherein the plurality of VCSELs is a first plurality of VCSELs, wherein the method further comprises providing a second plurality of VCSELs, and wherein each of the first and second pluralities of VCSELs consists of two VCSELs.

20. The method of claim 14, wherein the at least one VCSEL driver is configured to detect a current of the corresponding VCSEL, and wherein the microcontroller is configured to monitor a temperature of each VCSEL by receiving an indication of the current detected by the at least one VCSEL driver and determining a temperature of the corresponding VCSEL based on the respective indication of current.

* * * * *